United States Patent [19]
Abbruzzese et al.

[11] Patent Number: 5,934,465
[45] Date of Patent: Aug. 10, 1999

[54] CABLE TIE BANDOLIERS FOR USE WITH AUTOMATIC TOOLS

[75] Inventors: Salvatore J. Abbruzzese, Piscataway, N.J.; Mark A. Bordwell, Memphis, Tenn.; Michael A. Bridgman, Hughenden Valley, United Kingdom; William T. O'Neill, Grotton, Mass.; Peter M. Wells, Jr., Germantown, Tenn.; Derek Woods, Hazlemere, United Kingdom

[73] Assignee: Thomas & Betts Corporation, Memphis, Tenn.

[21] Appl. No.: 08/955,938

[22] Filed: Oct. 22, 1997

Related U.S. Application Data

[60] Provisional application No. 60/029,582, Oct. 22, 1996, and provisional application No. 60/029,584, Oct. 22, 1996.

[51] Int. Cl.$^6$ ............................ B65D 85/24; B65D 69/00; B21F 9/02
[52] U.S. Cl. ...................... 206/343; 24/16 PB; 206/820
[58] Field of Search ...................... 206/820, 338, 206/343–346; 24/16 PB, 17 AP, 30.5; 140/93 A, 93.2

[56] References Cited

U.S. PATENT DOCUMENTS

| | | |
|---|---|---|
| Re. 34,891 | 4/1995 | Kunreuther . |
| 2,823,789 | 2/1958 | Henning ............................ 206/820 X |
| 2,964,171 | 12/1960 | Chadwick .......................... 206/820 X |
| 3,085,292 | 4/1963 | Kindseth . |
| 3,196,196 | 7/1965 | Burbank . |
| 3,431,548 | 3/1969 | Busler ............................... 206/820 X |
| 3,515,778 | 6/1970 | Fields et al. . |
| 3,694,863 | 10/1972 | Wasserlein, Jr. ..................... 24/16 PB |
| 3,733,657 | 5/1973 | Lankton . |
| 3,741,385 | 6/1973 | Corey . |
| 3,977,050 | 8/1976 | Perez . |
| 3,979,799 | 9/1976 | Merser et al. . |
| 4,039,078 | 8/1977 | Bone . |
| 4,079,485 | 3/1978 | Collier et al. . |
| 4,230,757 | 10/1980 | Toner ............................... 206/456 X |
| 4,417,656 | 11/1983 | Kato . |
| 4,429,437 | 2/1984 | Paradis . |
| 4,456,123 | 6/1984 | Russell . |
| 4,495,972 | 1/1985 | Walker ............................... 140/93.2 |
| 4,501,782 | 2/1985 | Weatherly et al. . |
| 4,505,780 | 3/1985 | Sewards . |
| 4,534,464 | 8/1985 | Lankton . |
| 4,586,609 | 5/1986 | Won . |
| 4,632,297 | 12/1986 | Moody et al. ......................... 206/343 |
| 4,640,319 | 2/1987 | Walker .............................. 140/93 A |
| 4,640,320 | 2/1987 | Avison et al. ....................... 140/93 A |
| 4,654,935 | 4/1987 | Bone . |
| 4,712,677 | 12/1987 | Russell . |
| 4,790,225 | 12/1988 | Moody et al. . |
| 4,851,964 | 7/1989 | Endo . |
| 4,865,895 | 9/1989 | Vlamings . |
| 4,901,854 | 2/1990 | Bone et al. . |
| 5,038,931 | 8/1991 | Kunreuther . |
| 5,042,535 | 8/1991 | Schlottke .......................... 140/93 A |
| 5,119,528 | 6/1992 | Ono et al. . |
| 5,163,552 | 11/1992 | Thuswaldner . |
| 5,213,400 | 5/1993 | Helseth . |
| 5,223,063 | 6/1993 | Yamazaki et al. . |
| 5,303,821 | 4/1994 | Ayers . |
| 5,339,954 | 8/1994 | Kunreuther . |
| 5,395,197 | 3/1995 | Cario et al. . |
| 5,452,796 | 9/1995 | Ohuchi . |
| 5,482,420 | 1/1996 | Gabriel et al. . |
| 5,511,661 | 4/1996 | Karlis et al. . |
| 5,542,323 | 8/1996 | Habermehl et al. . |
| 5,586,353 | 12/1996 | Merser . |
| 5,595,220 | 1/1997 | Leban . |

FOREIGN PATENT DOCUMENTS

| | | |
|---|---|---|
| 0 571 666 A1 | 12/1993 | European Pat. Off. . |
| 25 12 825 | 9/1976 | Germany . |

OTHER PUBLICATIONS

PCT–Notification of Transmittal of the International Search Report or the Declaration, dated Feb. 3, 1998.

*Primary Examiner*—Bryon P. Gehman
*Attorney, Agent, or Firm*—Hoffmann & Baron, LLP

[57] ABSTRACT

A cable tie bandolier for use with automatic tools. A continuous length of cable ties may be formed utilizing a non-continuous molding operation by molding discrete shots of cable ties, such discrete shots having connection capability therebetween allowing the connection of one discrete shot of cable ties to a second discrete shot of cable ties thereby providing one continuous strip of cable ties.

13 Claims, 15 Drawing Sheets

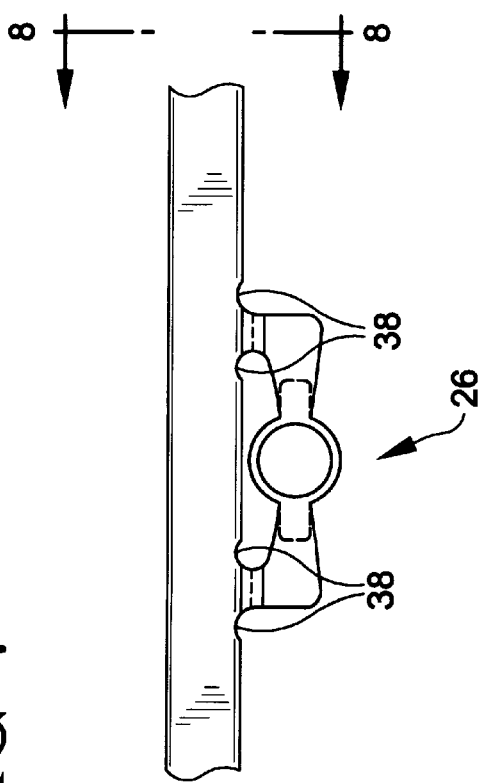

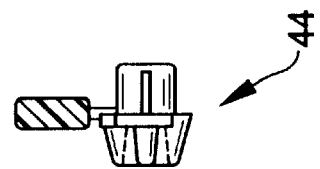
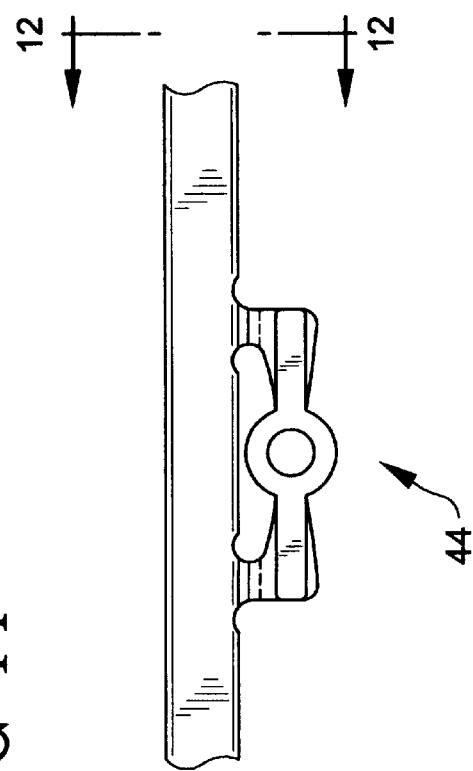

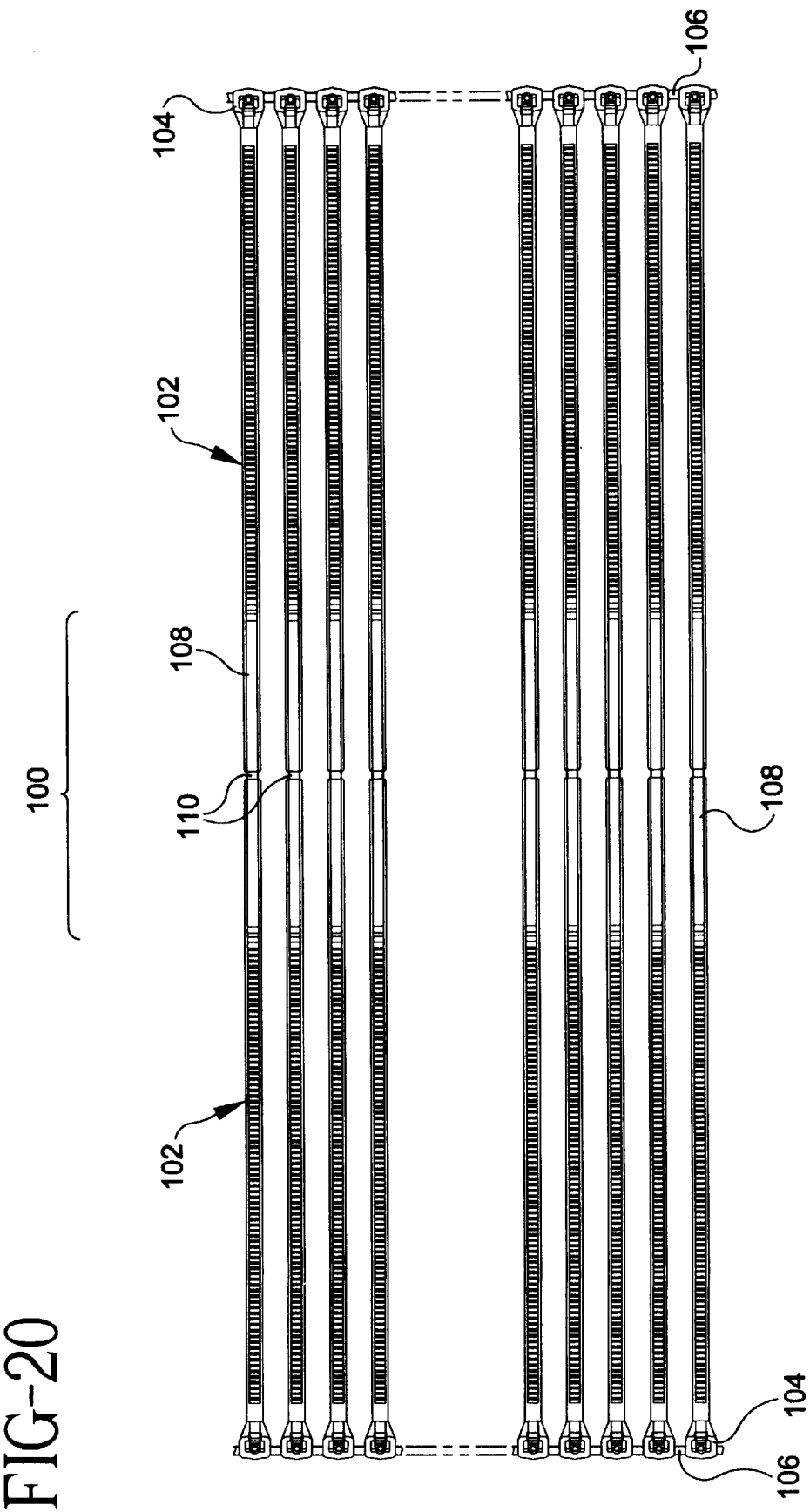

CABLE TIE BANDOLIERS FOR USE WITH AUTOMATIC TOOLS

This application claims the benefit of U.S. Provisional Application No. 60/029,582 filed Oct. 22, 1996 and U.S. Provisional Application No. 60/029,584 filed Oct. 22, 1996.

BACKGROUND OF THE INVENTION

The present invention relates to cable tie bandoliers for use with automatic cable tie tools, and, more particularly, to continuous cable tie bandoliers formed from non-continuous molding operations.

Cable ties have long been known in bundling electrical cables or like articles. As is well known, an individual cable tie includes an elongate strap body including a tail at one end and a head at the opposite end. The cable tie may be placed about a group of cables and the tail is inserted through the head. The head includes an appropriate locking mechanism such as a barb or pawl which cooperates with the tail to lock the strap body in the head.

It is also known to use appropriately constructed tools to apply cable ties about the bundle of cables. In certain instances, such cable tie tools are automatic cable tie tools which feed individual cable ties into the tool from a dispenser or other mechanism which supports a plurality of cable ties. These plurality of cable ties may be arranged in a dispenser in reels of wound cable ties known as a bandolier. Each bandolier of cable ties would include a plurality of side-by-side cable ties arranged in longitudinal succession.

The art has seen various techniques for reeling cable ties for use in automatic cable tie tools. However, each of the prior art devices have distinct disadvantages. For instance one technique is to support the cable ties in side-by-side fashion by use of a carrier strip extending exteriorly of the aligned heads. The carrier strip supports the cable ties in bandoliered fashion. It can be appreciated that the carrier strip results in excessive waste when the cable ties are cut from the carrier strip in the automatic cable tie tool.

Another technique is to form webs between adjacent cable ties to support the cable ties in side-by-side spaced fashion along the bandolier. However, to ensure that the cable ties remain parallel to one another in the bandolier, webs must be placed both adjacent the head and the tail so as to couple together side-by-side cable ties at two distinct locations. Again, this type of construction results in an increase in waste. Further it is difficult to mold such a configuration in an economical fashion. In addition, many of the techniques to form bandoliers of cable ties rely on the heads being supported at one end and the tails extending adjacent the other end. When such cable ties are wound on a reel, the wound bandolier is bulkier at the head end than at the end adjacent the tails. This results in difficulty in accurately supporting the wound bandolier of cable ties within an appropriate dispensing mechanism. Also there is a tendency for the tails to become intertwined. This renders automatic installation of the ties difficult.

In the manufacture of such cable ties, the ties are typically formed in a continuous molding operation, i.e. a plurality of longitudinally aligned cable ties (a shot of ties) is molded in one molding operation. Thereafter, the shot of ties is moved externally of the mold and a second longitudinally successive shot of ties is molded. In order to maintain continuity between the individual shots of cable ties, the finished shot must be maintained in contact with the mold so that the next successive shot of cable ties will be connected thereto.

In order to effectively form ties in such a fashion, each shot of ties must be manufactured on a relatively small scale. Thus, the individual shots of ties are manufactured with small cavity molds. Continuous molding in this fashion also results in slower cycle times as compared with the use of conventional larger cavity molds. Furthermore, if during the continuous molding process, a defective tie is manufactured, the entire strip of ties must be discarded. The present invention provides for the ability to continuously link together shots of cable ties without employing a continuous molding process.

There is therefore a need in the art for improved techniques for interconnecting the cable ties of a bandolier whereby the cable ties of such bandolier may be readily cut from the bandolier without excessive waste, the cable ties of such bandolier are sufficiently supported and maintained in proper alignment to facilitate use in the automatic tool and whereby the bandolier may be readily wound on a reel for use in an automatic tool. There is a further need in the art for a technique for forming a continuous bandolier of cable ties using a non-continuous molding operation.

SUMMARY OF THE INVENTION

The present invention, which addresses the needs of the prior art, relates to a cable ties bandolier for use with an automatic cable tie tool. The bandolier includes a first shot of interconnected cable ties. The first shot defines a first leading edge and a first trailing edge. The bandolier further includes a second shot of interconnected cable ties. The second shot defines a second leading edge and a second trailing edge. The edges include cooperating mechanical structure. The structure of the first trailing edge of the first shot cooperates with the structure of the second leading edge of the second shot to join the first and second shots into a continuous strip.

The present invention further relates to a cable tie bandolier for use with an automatic cable tie tool including a plurality of cable ties. Each of the ties includes a tail at one end and a head at the opposite end. The bandolier further includes at least one web positioned between and interconnecting adjacent ties. The web is located proximate the center of each tie whereby both the heads and the tails of adjacent ties are maintained in parallel alignment.

The present invention further relates to a bandolier for use with an automatic cable tie tool including a first row of cable ties disposed in substantially parallel alignment. Each of the cable ties in the first row includes a tail at one end and a head at the opposite end. The cable ties of the first row are arranged so as to locate the heads of the ties adjacent to one another. Each head in the first row is interconnected to at least one adjacent head. The bandolier further includes a second row of cable ties disposed in substantially parallel alignment. Each of the cable ties in the second row includes a tail at one end and a head at the opposite end. The cable ties of the second row are arranged so as to locate the heads of the ties adjacent to one another. Each head in the second row is interconnected to at least one adjacent head. The first and second rows are oriented about an axis of symmetry such that each of the tails in the second row is located proximate and interconnected to the tail of the cable tie of the second row.

Finally, the present inventions relates to a method of manufacturing a continuous strip of cable ties. The method includes the step of molding a first shot of interconnected cable ties. The first shot defines a first leading edge and a first trailing edge. The method further includes the step of molding a second shot of interconnected cable ties discrete from the first shot. The second shot defines a second leading edge and a second trailing edge. The method includes the additional step of attaching the second leading edge to the first trailing edge to provide a continuous strip of cable ties.

As a result, the present invention provides an improved technique for interconnecting the cable ties of a bandolier whereby the cable ties of such bandolier may be readily cut from the bandolier without excessive waste, the cable ties of such bandolier are sufficiently supported and maintained in proper alignment to facilitate use in the automatic tool and whereby the bandolier may be readily wound on a reel for use in an automatic tool. The present invention further provides a technique for forming a continuous bandolier of cable ties using a non-continuous molding operation.

BRIEF DESCRIPTION OF THE DRAWINGS

FIG. 7 is an enlarged detail of a female snap connector;

FIG. 8 is a view taken along lines 8—8 of FIG. 7;

FIG. 11 is an enlarged detail of a male sonically weldable connector;

FIG. 12 is a view taken along lines 12—12 of FIG. 11;

FIG. 20 is a top plan view of a bandolier of cable ties in accordance with one preferred embodiment of the present invention;

DETAILED DESCRIPTION OF THE INVENTION

As described herein, prior art bandoliers are typically formed in a continuous molding operation, i.e., a plurality of longitudinal aligned cable ties (a shot of ties) is molded in one molding operation. Thereafter, the shot of ties is moved externally of the mold and a second longitudinally successive shot of ties is molded. In order to maintain continuity between the individual shots of cable ties, the finished shot must be maintained in contact with the mold so that the next successive shot of cable ties will be connected thereto.

Rather than connecting one shot of cable ties to the next by continuous molding, the present invention contemplates manufacturing separate individual shots of cable ties which can be interconnected together subsequent to molding to form a continuous strip of cable ties of any desired length. In this regard, the present invention provides connection capability between the individual shots of cable ties which allows the mentioned post-molding interconnection thereof.

Figure 1:
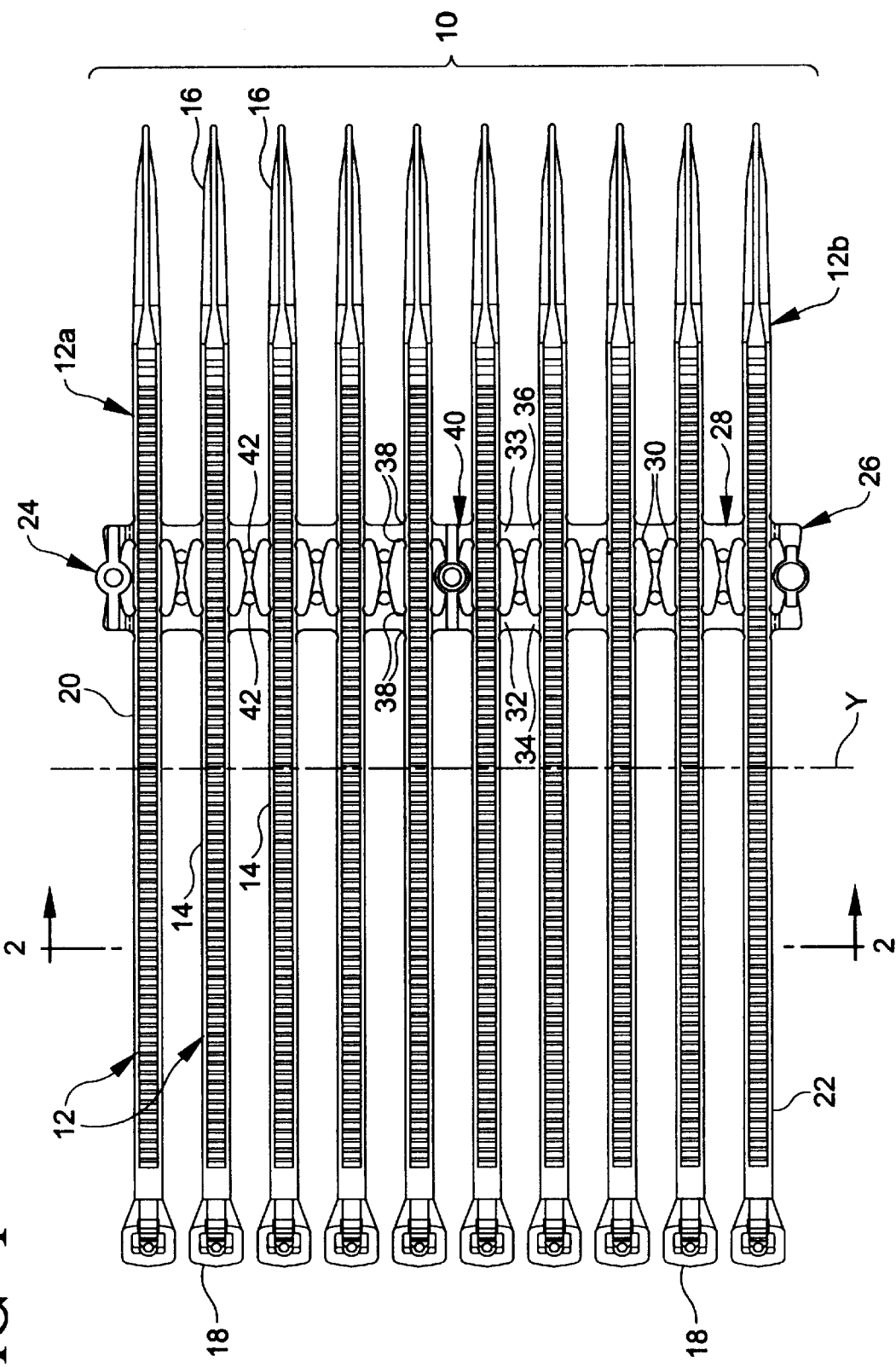
FIG. 1 is a plan view of a continuous bandolier of cable ties formed from two interconnected shots of cable ties.

An individual shot 10 of cable ties 12 is shown in FIG. 1. Shot 10 includes a plurality of cable ties 12 (e.g., 10 cable ties). Of course, each individual shot can include any number of cable ties, such number being limited only by the size of the molding apparatus.

Each cable tie 12 generally includes an elongate strap body 14 having a tail 16 at one end and a head 18 at the other end. In use, the cable tie is placed around a bundle of cables and the tail 16 is inserted through the head 18. The head 18 may include an appropriate locking mechanism such as a barb or a pawl which cooperates with the tail for securing a strap of body 14 within the head about the bundle of cables.

Each individual shot of ties defines a leading cable tie 12a and a trailing cable tie 12b. In turn, leading cable tie 12a defines a leading edge 20, while trailing cable tie 12b defines a trailing edge 22. In the embodiment of FIG. 1, both the leading and trailing edges 20, 22 are provided with a portion of structure sized and configured to cooperate with a complementary portion of structure formed on the edge of a second shot of ties. More particularly, the leading edge of one shot of ties includes a portion of structure sized and configured to cooperate with a portion of structure located on a trailing edge of another shot of ties, thus allowing interconnection of the two shots of ties into one continuous strip. If each shot included ten individual ties 12 (as shown in FIG. 1), the combined shots would form a continuous strip of twenty ties. As mentioned, the individual shots can be of as many ties as is commercially practical, and any number of individual shots can be joined together thereby allowing the formation of a continuous strip (i.e., a bandolier) of cable ties of any desired length.

Leading edge 20 of leading cable tie 12a includes a male snap connector 24, while trailing edge 22 of trailing cable tie 12b includes a female snap connector 26. It will be appreciated that this arrangement of the mentioned male and female snap connectors on the leading and trailing edges of the shot, respectively, allows the leading edge of one shot to be connected to trailing edge of the a second shot.

As shown in FIG. 1, the individual cable ties of the shot are interconnected by a web 28 which is integrally formed with the cable ties during the molding process. A web is preferably formed between each set of adjacent ties. As mentioned, the leading and trailing edges are provided with mechanical structure to allow connection of the shot to a second shot of cable ties.

The mold is preferably configured to form apertures 30 in each of the webs during the injection molding process. Apertures 30 facilitate the process of cutting the web free of the cable tie. More particularly, in one preferred embodiment, a single blade simultaneously cuts legs 32, 33 of the web, while a second blade simultaneously cuts legs 34, 36 of the web. As shown, a smooth notch 38 is formed on both sides of legs 32, 33, 34, and 36. These notches, which are formed in the edges of the cable ties during the molding process, facilitate the cutting operation and eliminate the likelihood of creating burrs or nicks which can subsequently produce stress fractures.

Figure 2:
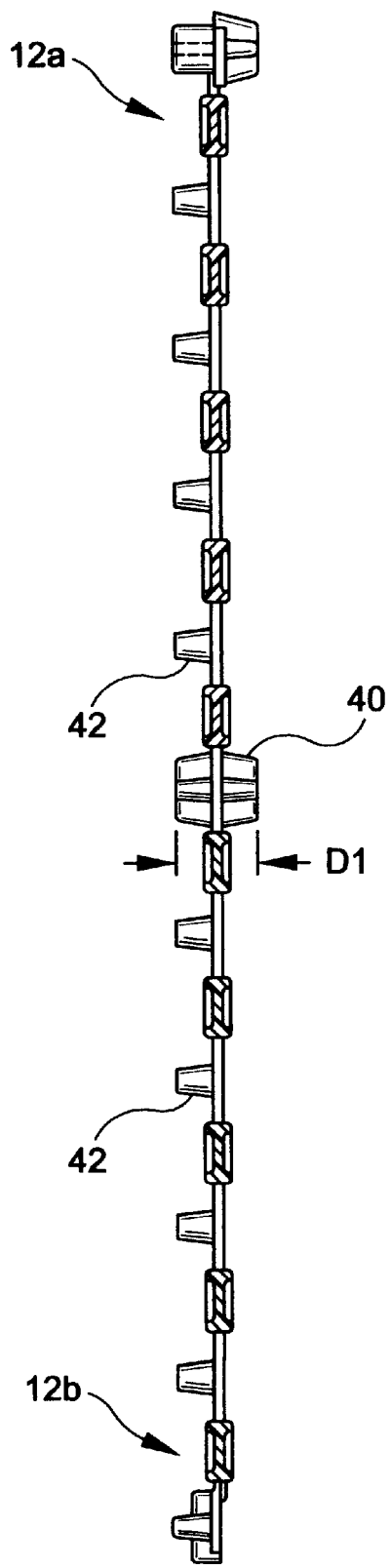
FIG. 2 is a sectional view taken along lines 2—2 of FIG. 1.
Figure 4:
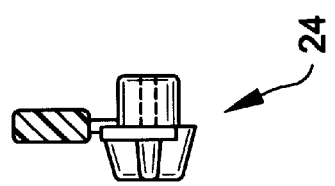
FIG. 4 is a view taken along lines 4—4 of FIG. 3.
Figure 3:
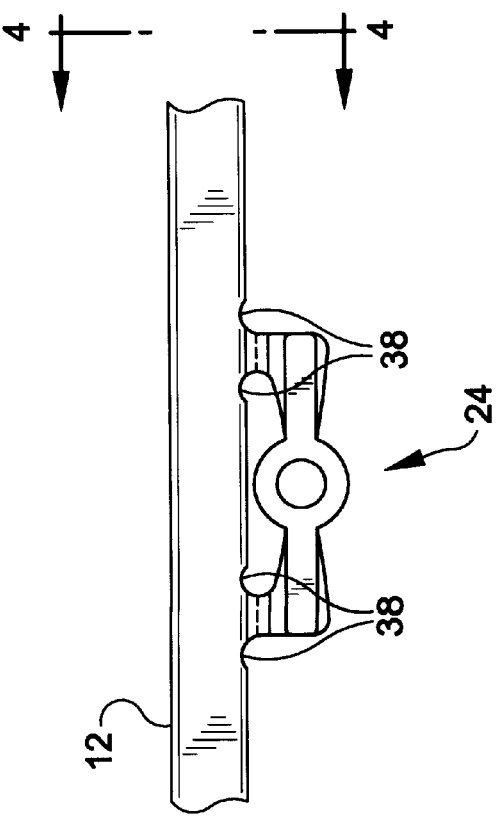
FIG. 3 is an enlarged detail of a male snap connector.
Figure 6:
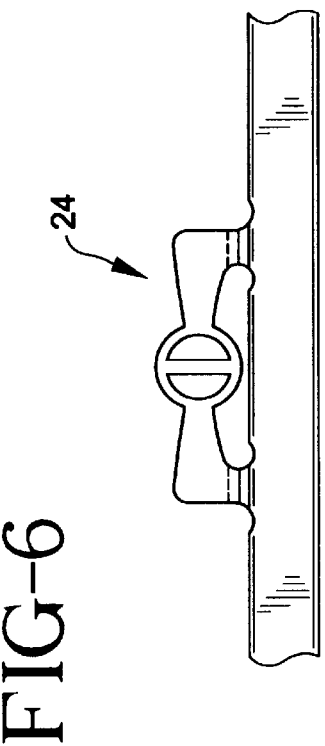
FIG. 6 is a bottom plan view of the connector of FIG. 3.
Figure 5:
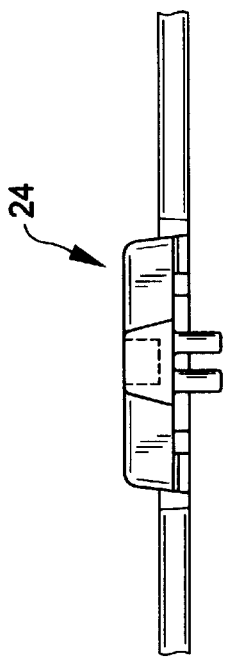
FIG. 5 is a side view of the connector of FIG. 3.
Figure 10:
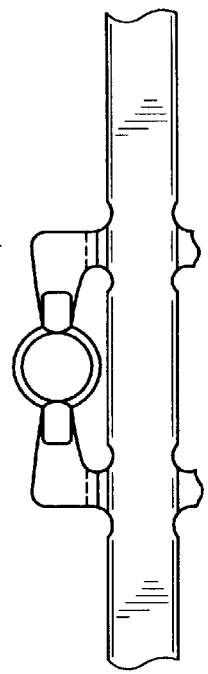
FIG. 10 is a bottom plan view of the connector of FIG. 7.
Figure 9:
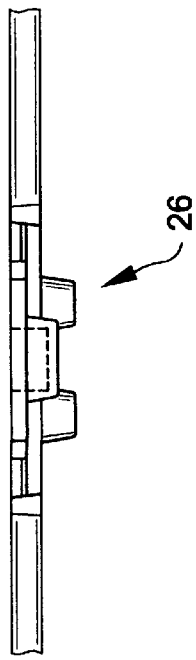
FIG. 9 is a side view of the connector of FIG. 7.
Figure 14:
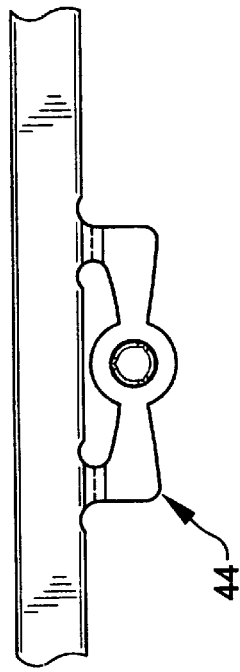
FIG. 14 is a bottom plan view of the connector of FIG. 11.
Figure 13:
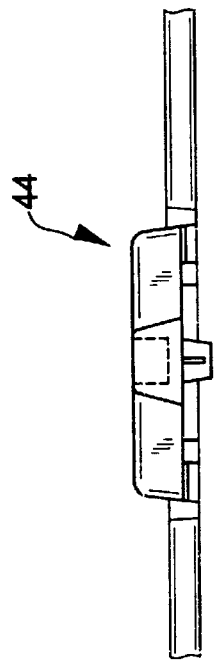
FIG. 13 is a side view of the connector of FIG. 11.
Figure 16:
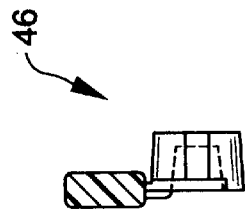
FIG. 16 is a view taken along lines 16—16 of FIG. 15.
Figure 15:
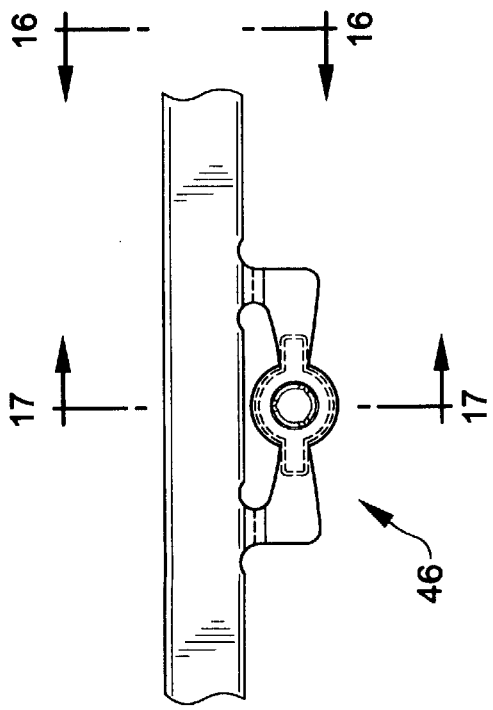
FIG. 15 is an enlarged detail of a female sonically weldable connector.
Figure 16A:
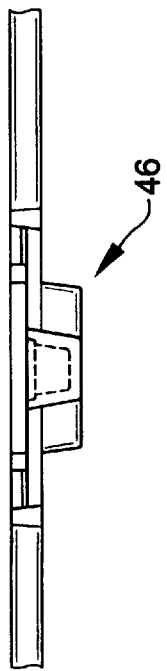
FIG. 16a is a side view of the connector of FIG. 15.
Figure 17:
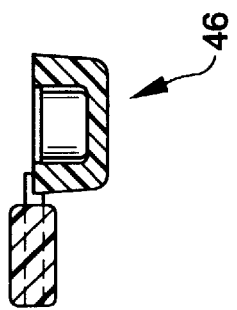
FIG. 17 is a sectional view taken along lines 17—17 of FIG. 15.
Figure 18:
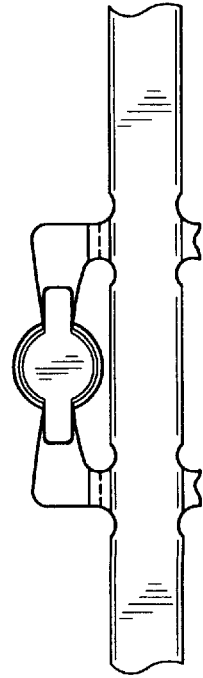
FIG. 18 is a bottom plan view of the connector of FIG. 15.

As best shown in FIG. 2, each shot 10 of cable ties is preferably provided with at least one dummy connector 40. As shown, the overall thickness of dummy connector 40 is $D_1$, which in one preferred embodiment is approximately 0.144 inches. The dummy connector is sized to correspond to the thickness of the connectors located on the leading and trailing edges of the shots once such connectors have been interfitted with an adjacent connector on a second shot of cable ties. The inclusion of dummy connector 40 facilitates the bundling of the final bandolier of cable ties by creating a uniform thickness at pre-determined spots along the length of the bundle.

Each web also includes a plurality of indexing bosses 42. The embodiment of FIG. 1 includes two such bosses on each web. As will be recognized by those skilled in the art, indexing bosses 42 are utilized by the dispensing mechanism to properly index and orient the cable ties in the automatic tool. As shown in FIG. 2, bosses 42, which extend from a single surface of the web, are preferably formed with a height which corresponds to one-half the thickness of dummy connector 40.

As shown in FIG. 1, web 28 is preferably positioned on the tail side of an axis Y, such axis defining the center of length of the cable tie. Stated differently, web 28 is located closer to the tail end of the cable tie than to the head end of the cable tie. The location of web 28 at a position closer to the tail end of the cable tie ensures that the tails of the bandolier are maintained in proper alignment. It will be recognized that the dispenser of an automatic cable tie tool feeds the ties to the tools in a "tail-forward" fashion. Thus, it is typically of greater importance to maintain the tails of cable tie bandolier in a pre-determined alignment than the heads of such bandolier. It will be appreciated that once the tail end of a cable tie is directed towards the automatic tool, the head will naturally follow.

As mentioned, each shot of cable ties is preferably formed through an injection-molding operation. The size of the mold determines the number of individual cable ties in such shot. One preferred material contemplated by the present invention is nylon 6-6. It is further contemplated that for shots of a greater number of ties, more than a single dummy connector may be required. In one preferred embodiment, a dummy connector is located adjacent every fifth tie. Of course, the number of dummy connectors can be increased or decreased based on the specification and the requirements of the automatic tool.

Referring to FIGS. 3 to 10, the male and female connectors, i.e., male snap connector 24 and female snap connector 26, are shown in greater detail. These connectors are also formed with notches 30 about the legs thereof to facilitate the cutting of the connector from the cable tie. As shown, the male and female connectors are sized to cooperate with one another in a snap fit manner which result in substantially permanent connection therebetween.

Figure 19B:
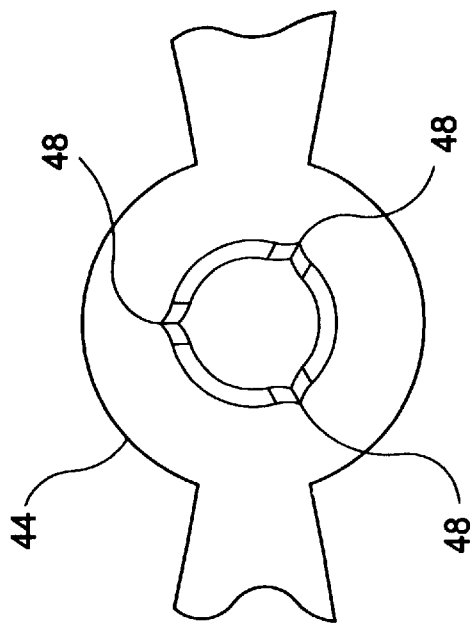
FIG. 19b is another enlarged detail of the male sonically weldable connector of FIG. 11.
Figure 19A:
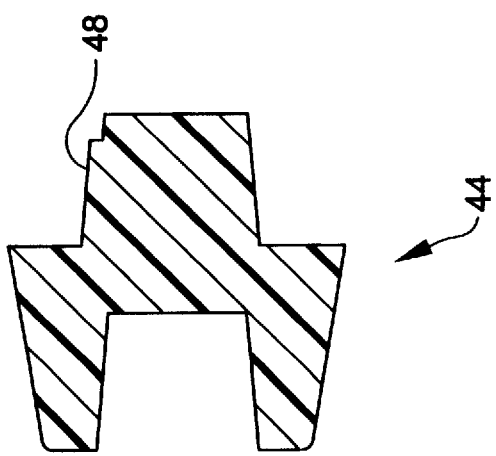
FIG. 19a is an enlarged detail of the male sonically weldable connector of FIG. 11.

Referring now to FIGS. 11 to 18, it is contemplated herein that the cooperating interfitting mechanical structure located on the leading and trailing edges of the cable ties may subsequently be exposed to an ultrasonic welding process following the interfitting of such structure. In this regard, a male sonically weldable connector 44 and a female sonically weldable connector 46 are utilized on the leading and trailing edges of the individual shots of cable ties. As will be appreciated by those skill in the art, ultrasonic welding is a process whereby ultrasonic energy is directed at a pre-determined location, i.e., the sonically weldable connectors, which results in the melting of at least a portion of the material of such connector whereby the male and female connectors are fused to one another. In this regard, the male sonically weldable connector is preferably provided with a plurality of external ribs 48 which function as the ultrasonic directors for concentrating ultrasonic energy applied to the connector (see FIGS. 19a to 19b).

Figure 20A:
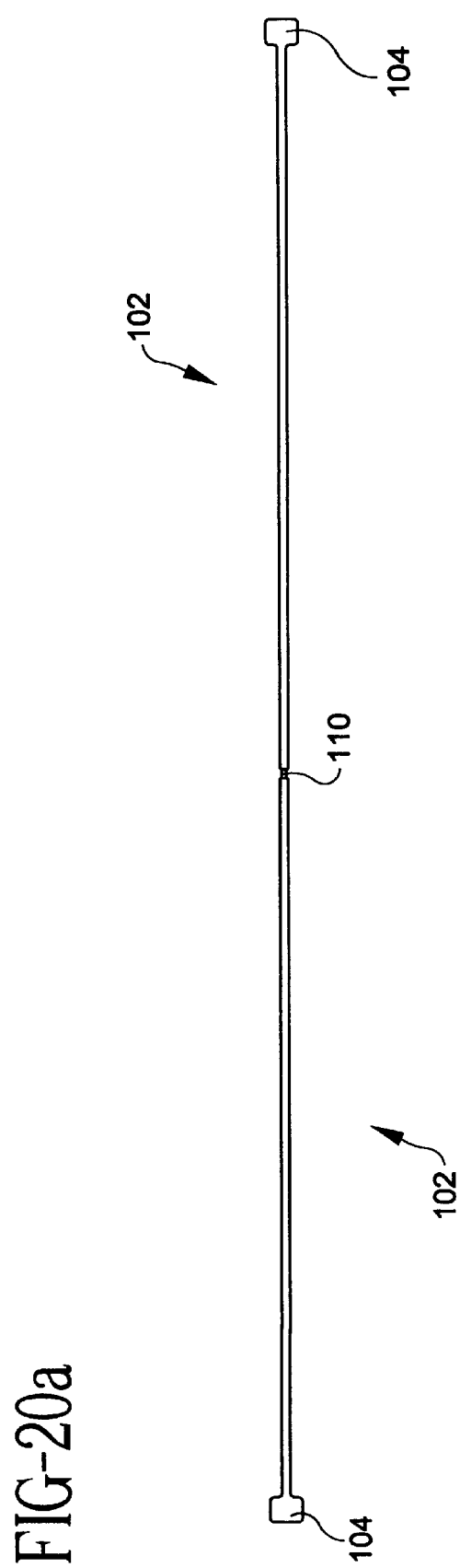
FIG. 20a is a side view of the bandolier of FIG. 20.

Referring to FIGS. 20 to 20a, a shot 100 of plural cable ties 102 molded in accordance with an alternative embodiment of the present invention is shown. Shot 100 includes a plurality of longitudinally aligned cable ties 102. The cable ties are arranged in two rows of side-by-side cable ties with each row of cable ties being connected in a tail-to-tail fashion. Thus, the heads 104 of the cable ties are disposed at opposite ends of the shot 100. Such a shot of cable ties may be manufactured in large cavitational molds having multiple cavities.

The individual ties 102 of the shot 100 may be connected between the heads 104 by a web 106 of material. Each tail 108 is connected to the tail 108 of the opposed cable tie of the other row. An additional web of material 110 is formed between the end-to-end tails.

Rather than connecting one shot of cable ties 100 to the next by continuous molding, the present invention contemplates manufacturing separate individual shots of cable ties which can be interconnected together subsequent to molding to form a continuous strip of cable ties of any desirable length. In this regard, the present invention provides connection capability between the individual shots of cable ties.

Figure 21:
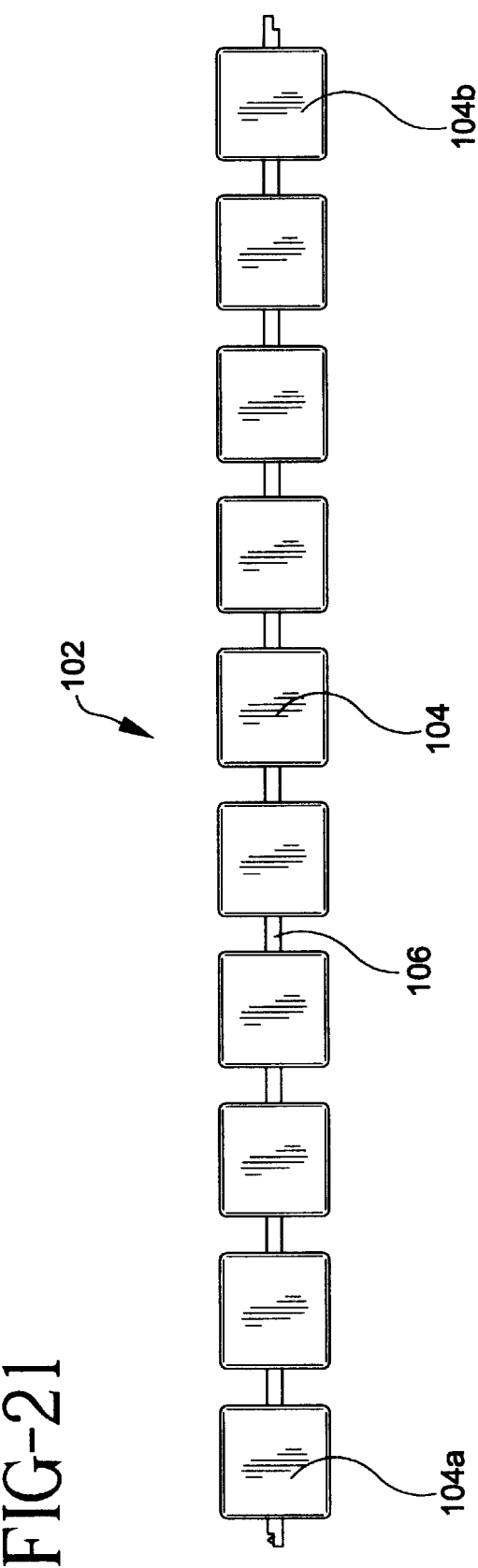
FIG. 21 is an end view of the bandolier of FIG. 20.

Referring to FIG. 21, the heads of the two rows of cable ties are shown in end view. The individual cable tie heads 104 at each longitudinal end of the two rows include interconnection structure which allows the heads of the end cable ties of one shot to be connected to the heads of the end cable ties of the next subsequently formed shot. Several techniques for mechanically interconnecting the shots of cable ties may be employed.

Figure 22:
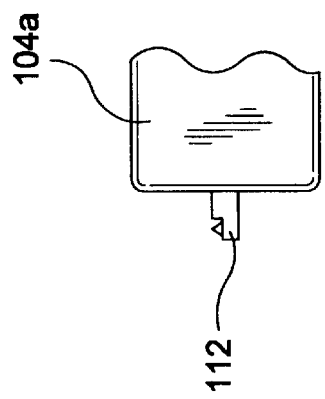
FIG. 22 is an enlarged detail taken from FIG. 21.
Figure 23:
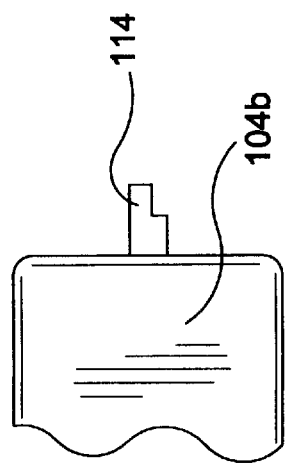
FIG. 23 is an enlarged detail taken from FIG. 21.

In the present invention with additional reference to FIGS. 22 and 23, one technique is particularly described. Head 104a at the end of one row of cable ties may include a mechanical interfitting structure 112 (detail B). The end cable tie head 104b in longitudinal opposition thereto may include a mechanically complimentary intermitting structure 114 extending therefrom (detail A). Structures 112 and 114 extend from heads 104a and 104b in a manner similar to webs 106 extending between the other heads 104. It can be appreciated that structure 112 of one shot of cable ties may be mechanically interfitted with structure 114 of an adjacent shot of cable ties so as to continuously connect successive shots of cable ties.

Figure 24:
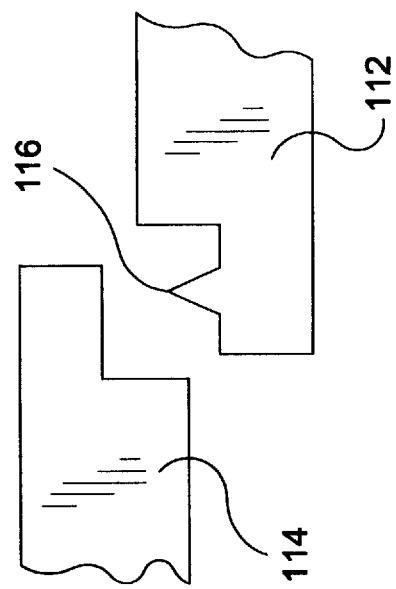
FIG. 24 is an enlarged detail illustrating the cooperation of the interfitting structure provided on the shots of cable ties.

The present invention contemplates employing ultrasonic welding techniques to secure one shot of cable ties to the next using interfitting structure 112 and 114. As shown in FIG. 24, one of the structures, for instance, structure 112 may include an extending director 116 which serves to concentrate the ultrasonic energy so as to securely ultrasonically weld structure 112 to structure 114.

While ultrasonic welding has been shown as the preferred method of continuously connecting shots of cable ties, other mechanical interfitting structures may be incorporated into the molded shot of cable ties. For instance, a structure such as intermitting snap members or the like may also be employed to mechanically couple one shot of cable ties to the next successive shot of cable ties. Any other mechanical connection technique may also be employed.

It may be apparent that connection of the shots occur at both ends of the shot, i.e. at the heads of each row of ties. Once a desired number of shots of cable ties are coupled together in longitudinally successive fashion, the continuous strip of cable ties may be rolled around a reel or the like (not shown). Cable tie reels of such construction have particular utility in automatic cable tie tools which are used to apply cable ties about a bundle of cables or like articles.

The present invention provides several advantages over other techniques used to form continuous strips of cable ties. The present invention allows use of larger cavitational tooling which reduces the cost of the product. Furthermore, the cycle times necessary to form a shot of cable ties can be reduced. Finally, if in the manufacture of one shot of cable ties a defective cable tie is formed, that shot of cable ties can be discarded and the next successive shot of cable ties can be connected to the strip. Thus, one defective tie will not result in the necessity to discard a larger continuously molded strip of cable ties. Such a technique reduces scrap and lowers the cost of the product while increasing the quality of the cable tie strip manufactured thereby.

The bandolier of FIGS. 20 to 20a solves many of the deficiencies of the prior art by arranging the cable ties in two longitudinally extending rows of side-by-side cable ties with the heads of one row being mutually interconnected by webs therebetween and the heads of the other row being mutually interconnected by webs therebetween. The tails of each cable tie of one row are connected to the tails of the adjacent cable tie of the other row.

With reference to FIGS. 20 and 20a, bandolier 100 includes webs 106 integrally formed between the heads 104. The webs are formed along with the molding process which forms the bandolier of a plurality of cable ties. The webs serve to space the heads apart from one another. The webs are formed of a thin plastic material which may be easily severed during the dispensing process. The webs leave minimal waste and can be discarded in an easy fashion. The webs between the heads allow the cable ties to extend in substantially side-by-side parallel fashion where the tails of the cable ties of each row are longitudinally spaced from one another. In order to maintain stability between the ties of one row and the ties of the other row, the tails of the ties of one row are interconnected to the tails of the ties of the adjacent row. The molding process of the present invention forms a web 110 between oppositely adjacent tails of the cable ties so that the ties of one row are webbed together to the ties of the adjacent row.

Several advantages are achieved with the bandolier of FIG. 20. First, when winding the bandolier of cable ties on a reel, both opposite ends of the bandolier have the same thickness, thus the wound bandolier has uniform bulk at both ends and may be easily inserted into a dispenser. Second, by interconnecting adjacent tails, the tails are maintained in protective position preventing damage thereto. Damage to the tails during shipment or use in the automatic cable tie tool will result in difficulties in attempting to automatically bind the cable tie about a bundle of cables in an automatic tool environment. Furthermore, as the ties of the bandolier are employed in a dual row configuration, the thickness of the reel of ties for a given amount of ties is reduced significantly. This allows for a more compact dispenser and also reduces the chances of entanglement of the individual cable ties on the reel.

It will be appreciated that the present invention has been described herein with reference to certain preferred or exemplary embodiments. The preferred or exemplary embodiments described herein may be modified, changed, added to or deviated from without departing from the intent, spirit and scope of the present invention, and it is intended that all such additions, modifications, amendment and/or deviations be included within the scope of the followings claims.

What is claimed is:

1. A cable tie bandolier for use with an automatic cable tie tool, comprising:

first discrete shot of interconnected cable ties, said first shot defining a first leading edge and a first trailing edge;

a second discrete shot of interconnected cable ties, said second shot defining a second leading edge and a second trailing edge;

wherein said edges include cooperating mechanical structure, and wherein said structure of said first trailing edge of said first shot cooperates with said structure of said second leading edge of said second shot to join said first and second shots into a continuous strip;

each of said cable ties including a tail at one end, a head at the opposite end, and a strap body extending therebetween, each of said cable ties defining a length extending in the direction of said strap body and having a center located on said strap body along said length; and wherein said cable ties in each of said shots are interconnected by a web positioned between adjacent ties and located proximate the center of each of said adjacent ties whereby both said heads and tails of said adjacent ties are maintained in parallel alignment.

2. The bandolier according to claim 1, wherein said web comprises a one-piece member integrally formed with said adjacent ties.

3. The bandolier according to claim 1, wherein said web is located closer to said tail of said tie than to said head of said tie to ensure accurate alignment of said tails.

4. The bandolier according to claim 1, wherein at least a portion of material is removed from said web along at least one side thereof to facilitate cutting of said web from said bandolier during installation of said cable ties.

5. The bandolier according to claim 1, wherein the sides of said cable ties are provided with smooth notches proximate said web to facilitate cutting of said web from said ties.

6. A cable tie bandolier for use with an automatic cable tie tool, comprising:

a plurality of cable ties, each of said ties including a tail at one end, a head at the opposite end, and a strap body extending therebetween, each of said cable ties defining a length extending in the direction of said strap body and having a center located on said strap body along said length; and a web positioned between and interconnecting adjacent ties, said web located proximate the center of each of said adjacent ties whereby both said heads and tails of adjacent ties are maintained in parallel alignment; and wherein said web comprises the exclusive means for interconnecting said adjacent ties.

7. The bandolier according to claim 6, wherein said web is integrally formed with said adjacent cable ties.

8. The bandolier according to claim 6, wherein at least a portion of material is removed from said web along at least one side thereof to facilitate cutting of said web from said bandolier during installation of said cable ties.

9. The bandolier according to claim 6, wherein said web is located closer to said tail of said tie than to said head of said tie whereby alignment of said tails is accomplished.

10. The bandolier according to claim 6, wherein the sides of said cable ties are provided with smooth notches proximate said web to facilitate cutting of said web from said ties without burrs.

11. The bandolier according to claim 6, wherein said web comprises a one-piece member integrally formed with the ties adjacent thereto.

12. The bandolier according to claim 1, wherein said web comprises the exclusive means for interconnecting said adjacent ties.

13. The bandolier according to claim 1, wherein each of said shots includes a leading and trailing cable tie, and wherein said cooperating mechanical structure is located along said strap body of said leading and trailing cable ties proximate said web.

* * * * *